US009809665B2

(12) United States Patent
Menschig et al.

(10) Patent No.: US 9,809,665 B2
(45) Date of Patent: Nov. 7, 2017

(54) POLYISOBUTYLENE PRODUCTION PROCESS WITH IMPROVED EFFICIENCIES AND/OR FOR FORMING PRODUCTS HAVING IMPROVED CHARACTERISTICS AND POLYISOBUTYLENE PRODUCTS PRODUCED THEREBY

(75) Inventors: Klaus R. Menschig, Downers Grove, IL (US); Sohel Shaikh, Sugar Land, TX (US); Sathy R. Ponnuswamy, Pearland, TX (US); Rex Lawson, Pearland, TX (US)

(73) Assignee: TPC GROUP LLC, Houston, TX (US)

( * ) Notice: Subject to any disclaimer, the term of this patent is extended or adjusted under 35 U.S.C. 154(b) by 456 days.

(21) Appl. No.: 12/932,837

(22) Filed: Mar. 8, 2011

(65) Prior Publication Data

US 2011/0251359 A1 Oct. 13, 2011

Related U.S. Application Data

(62) Division of application No. 12/468,195, filed on May 19, 2009, now abandoned.

(51) Int. Cl.
*C08F 10/10* (2006.01)
*C08F 110/10* (2006.01)

(52) U.S. Cl.
CPC ............ *C08F 110/10* (2013.01); *C08F 10/10* (2013.01); *C08F 2400/02* (2013.01)

(58) Field of Classification Search
None
See application file for complete search history.

(56) References Cited

U.S. PATENT DOCUMENTS 132,264 A 10/1872 Eames et al.
2,139,038 A 12/1938 Russell
(Continued)

FOREIGN PATENT DOCUMENTS

CA 2195575 2/1996
CA 2217848 12/1996
(Continued)

OTHER PUBLICATIONS

Supplementary European Search Report.
1st examination report from Saudi Arabian application.

*Primary Examiner* — Richard A Huhn
(74) *Attorney, Agent, or Firm* — Michael W. Ferrell

(57) ABSTRACT

A process for production of polyisobutylene includes subjecting a reaction admixture comprising isobutylene, a diluent for the isobutylene, which may be isobutane, and a catalyst composition, that may include a $BF_3$/methanol catalyst complex, to reaction conditions suitable for causing at least a portion of the isobutylene to undergo polymerization to form a polyisobutylene product including polyisobutylene molecules. At least a fraction of the polyisobutylene molecules thus produced have alpha position double bonds and the polyisobutylene product has a number average molecular weight ($M_N$) and a polydispersity index (PDI). The concentration of the diluent in the reaction admixture may be manipulated to control or change any one or more of (a) the relative size of the fraction, (b) the number average molecular weight of the product, (c) the polydispersity index of the product and (d) the relative size of the portion. The diluent concentration may be held constant to maintain any one or more of such characteristics constant.

4 Claims, 7 Drawing Sheets

(56) References Cited

U.S. PATENT DOCUMENTS

| | | | |
|---|---|---|---|
| 2,379,656 A | | 7/1945 | Ruthruff |
| 2,407,494 A | | 9/1946 | Hartvigsen |
| 2,411,097 A | | 11/1946 | Kopp |
| 2,559,062 A | | 7/1951 | Domte |
| 2,559,984 A | | 7/1951 | Montgomery et al. |
| 2,727,022 A | | 12/1955 | Linsk |
| 2,775,577 A | * | 12/1956 | Schmeider et al. ............ 526/77 |
| 2,815,335 A | | 3/1957 | Welch |
| 2,833,840 A | | 5/1958 | Longwell |
| 2,852,500 A | | 9/1958 | Alexander et al. .......... 260/88.1 |
| 2,856,395 A | | 10/1958 | Richard, Jr. et al. |
| 2,889,370 A | | 6/1959 | Schechter |
| 2,918,508 A | | 12/1959 | Coopersmith et al. |
| 3,024,226 A | | 3/1962 | Nolan, Jr. et al. |
| 3,166,546 A | | 1/1965 | Nolan, Jr. et al. |
| 3,284,537 A | | 11/1966 | Webb, Jr. |
| 3,306,907 A | | 2/1967 | McNinch et al. |
| 3,346,354 A | | 10/1967 | Kautsky et al. |
| 3,382,291 A | | 5/1968 | Brennan |
| 3,634,383 A | | 1/1972 | Miller, Jr. |
| 3,726,842 A | | 4/1973 | Treischmann et al. |
| 3,778,487 A | | 12/1973 | Driscoll et al. |
| 3,780,128 A | | 12/1973 | Shubkin |
| 3,849,085 A | | 11/1974 | Kreuz et al. |
| 3,927,041 A | | 12/1975 | Cengel et al. |
| 3,935,249 A | | 1/1976 | Puskas et al. |
| 3,991,129 A | | 11/1976 | Daniels |
| 4,110,521 A | | 8/1978 | Barnett et al. |
| 4,152,499 A | | 5/1979 | Boerzel et al. |
| 4,227,027 A | | 10/1980 | Booth et al. |
| 4,231,759 A | | 11/1980 | Udelhofen et al. |
| 4,238,628 A | | 12/1980 | Cahill et al. |
| 4,242,531 A | | 12/1980 | Carter |
| 4,311,808 A | | 1/1982 | Su |
| 4,383,093 A | | 5/1983 | Shiraki et al. |
| 4,391,959 A | | 7/1983 | Fauth et al. |
| 4,400,493 A | | 8/1983 | Abernathy, Jr. et al. |
| 4,429,099 A | | 1/1984 | Kennedy et al. |
| 4,433,197 A | | 2/1984 | Vogel et al. |
| 4,465,819 A | | 8/1984 | Kosanovich et al. |
| 4,558,104 A | | 12/1985 | Bronstert et al. |
| 4,605,808 A | | 8/1986 | Samson |
| 4,664,406 A | | 5/1987 | Spitaler et al. |
| 4,691,072 A | | 9/1987 | Schick et al. |
| 4,862,702 A | | 9/1989 | O'Neal |
| 4,973,733 A | | 11/1990 | Valkovich et al. |
| 4,982,042 A | | 1/1991 | Akatsu et al. |
| 5,068,490 A | | 11/1991 | Eaton |
| 5,175,225 A | | 12/1992 | Ruhe, Jr. |
| 5,191,044 A | | 3/1993 | Rath et al. |
| 5,192,335 A | | 3/1993 | Cherpeck |
| 5,254,649 A | | 10/1993 | Miln et al. |
| 5,254,784 A | | 10/1993 | Nurminen et al. |
| 5,286,823 A | | 2/1994 | Rath |
| 5,300,701 A | | 4/1994 | Cherpeck |
| 5,408,018 A | | 4/1995 | Rath |
| 5,439,991 A | | 8/1995 | Colman et al. |
| 5,448,001 A | | 9/1995 | Baird |
| 5,556,932 A | | 9/1996 | Rath et al. |
| 5,563,313 A | | 10/1996 | Chung et al. |
| 5,710,225 A | | 1/1998 | Johnson et al. |
| 5,731,379 A | | 3/1998 | Kennan et al. |
| 5,733,993 A | | 3/1998 | Yu et al. |
| 5,767,334 A | | 6/1998 | Nissfolk et al. |
| 5,779,742 A | | 7/1998 | Baker |
| 5,792,729 A | | 8/1998 | Harrison et al. |
| 5,811,616 A | | 9/1998 | Holub et al. |
| 5,814,706 A | | 9/1998 | Yu et al. |
| 5,910,550 A | | 6/1999 | Rath |
| 5,945,575 A | | 8/1999 | Sigwart et al. |
| 5,962,604 A | | 10/1999 | Rath |
| 5,977,251 A | | 11/1999 | Kao et al. |
| 6,132,827 A | | 10/2000 | Miro |
| 6,300,444 B1 | | 10/2001 | Tokumoto et al. |
| 6,361,856 B1 | | 3/2002 | Wakai et al. |
| 6,384,154 B1 | | 5/2002 | Sigwart et al. |
| 6,407,186 B1 | | 6/2002 | Rath et al. |
| 6,441,110 B1 | | 8/2002 | Sigwart et al. |
| 6,479,598 B1 | | 11/2002 | Lewtas et al. |
| 6,517,373 B2 | | 2/2003 | Rath et al. |
| 6,525,149 B1 | | 2/2003 | Baxter, Jr. et al. |
| 6,562,913 B1 | | 5/2003 | Baxter, Jr. et al. |
| 6,642,239 B2 | | 11/2003 | Rath |
| 6,683,138 B2 | | 1/2004 | Baxter, Jr. et al. |
| 6,777,506 B1 | | 8/2004 | Baxter, Jr. et al. |
| 6,844,400 B2 | | 1/2005 | Baxter, Jr. et al. |
| 6,844,401 B2 | | 1/2005 | Baxter, Jr. et al. |
| 6,858,188 B2 | | 2/2005 | Baxter, Jr. et al. |
| 6,884,858 B2 | | 4/2005 | Baxter, Jr. et al. |
| 6,992,152 B2 | | 1/2006 | Lobue et al. |
| 7,037,999 B2 | | 5/2006 | Baxter, Jr. et al. |
| 7,049,363 B2 | | 5/2006 | Auer et al. |
| 7,056,990 B2 | | 6/2006 | Baxter, Jr. et al. |
| 7,091,285 B2 | | 8/2006 | Baxter, Jr. et al. |
| 7,105,616 B2 | | 9/2006 | Auer |
| 7,441,104 B2 | | 10/2008 | Morris |
| 7,498,396 B2 | | 3/2009 | Baxter, Jr. et al. |
| 2003/0040587 A1 | | 2/2003 | Baxter, Jr. |
| 2003/0162918 A1 | | 8/2003 | Wettling et al. |
| 2003/0191257 A1 | | 10/2003 | Wettling et al. |
| 2005/0090612 A1 | | 4/2005 | Soane |

FOREIGN PATENT DOCUMENTS

| | | | |
|---|---|---|---|
| CA | 2334263 | 12/1999 | |
| DE | 27 02 604 | 7/1978 | |
| DE | 1 592 016 | 7/1981 | |
| DE | 199 52 030 | 5/2001 | |
| EP | 0 145 235 | 6/1985 | |
| EP | 0 244 616 | 3/1987 | |
| EP | 0 279 456 | 8/1988 | |
| EP | 0 322 241 | 6/1989 | |
| EP | 0 355 997 | 2/1990 | |
| EP | 0 400 905 | 12/1990 | |
| EP | 0 481 297 | 4/1992 | |
| EP | 0 628 575 | 12/1994 | |
| EP | 0 671 419 | 9/1995 | |
| EP | 0 742 191 | 11/1996 | |
| EP | 0 628 022 | 3/1998 | |
| EP | 0 831 141 | 3/1998 | |
| EP | 0 628 022 | 11/1998 | |
| GB | 1 159 368 | 7/1969 | |
| GB | 2 181 145 | 4/1987 | |
| WO | WO/93/10063 | 5/1993 | |
| WO | WO 94/14739 | 4/1994 | |
| WO | WO 99/31151 | 6/1999 | |
| WO | WO 99/64482 | 12/1999 | |
| WO | WO 00/77056 | 12/2000 | ............ C08F 10/10 |
| WO | WO 01/19873 | 3/2001 | |
| WO | WO 01/27172 | 4/2001 | |
| WO | WO 01/96426 | 12/2001 | ............ C08F 110/10 |
| WO | WO 02/06359 | 1/2002 | |
| WO | WO 02/14385 | 2/2002 | |

\* cited by examiner

POLYISOBUTYLENE PRODUCTION PROCESS WITH IMPROVED EFFICIENCIES AND/OR FOR FORMING PRODUCTS HAVING IMPROVED CHARACTERISTICS AND POLYISOBUTYLENE PRODUCTS PRODUCED THEREBY

CROSS REFERENCE TO RELATED APPLICATIONS

This application is a Divisional Application of U.S. patent application Ser. No. 12/468,195, entitled "Polyisobutylene Production Process with Improved Efficiencies and/or for Forming Products having Improved Characteristics and Polyisobutylene Products Produced Thereby", filed May 19, 2009, currently pending and under prosecution. The priority of U.S. patent application Ser. No. 12/468,195 is hereby claimed and its disclosure incorporated herein by reference in its entirety.

FIELD OF THE INVENTION

The invention described hereinafter relates to improvements in the polymerization of isobutylene. In particular, the invention relates to processes for preparing polyisobutylene (PIB) products having improved characteristics. More particularly, the invention relates to techniques for manipulation and control of liquid phase processes for producing polyisobutylene, polyisobutylene products having pre-selected characteristics, and methodology which enhances the operation and control of polyisobutylene reactors.

BACKGROUND OF THE INVENTION

U.S. Pat. No. 6,562,913 issued on May 13, 2003 and entitled "Process for Producing High Vinylidene Polyisobutylene" (hereinafter the '913 patent) relates, inter alia, to liquid phase polymerization processes for preparing low molecular weight (number average molecular weight ($M_N$) less than about 10,000), highly reactive (terminal double bond content of at least about 70%) polyisobutylene products. In accordance with the disclosure of the '913 patent, a catalyst composition, which desirably may comprise a complex of $BF_3$ and complexing agent such as methanol, and a feedstock containing isobutylene, are each introduced into a reaction zone where the same are intimately admixed with residual reaction mixture so as to present an intimately intermixed reaction admixture in the reaction zone. The intimately intermixed reaction admixture is maintained in its intimately intermixed condition and at a relatively constant temperature of at least about 0° C. while the same is in the reaction zone, whereby isobutylene therein is polymerized to form a polyisobutylene product having a high degree of terminal (vinylidene) unsaturation. A crude product stream comprising residual catalyst composition, unreacted isobutylene and polyisobutylene is then withdrawn from the reaction zone.

The introduction of feedstock into and the withdrawal of product stream from the reaction zone are each controlled such that the residence time of the isobutylene undergoing polymerization in the reaction zone is no greater than about 4 minutes, whereby the product stream contains a highly reactive polyisobutylene product. Preferably, the reaction zone may be the tube side of a shell-and-tube exchanger in which a coolant is circulated on the shell side. A recirculation loop may desirably be employed to circulate the reaction admixture through the tube side reaction zone at a linear velocity sufficient to establish and maintain an intimately intermixed condition in the admixture and remove heat generated by the exothermic polymerization reaction.

U.S. Pat. No. 7,037,999 issued on May 2, 2006 and entitled "Mid-Range Vinylidene Content Polyisobutylene Polymer Product and Process for Producing the Same" (hereinafter the '999 patent) describes, inter alia, mid-range vinylidene content PIB polymer products and processes for making the same. In accordance with the disclosure of the '999 patent, at least about 90% of the PIB molecules present in the product are polyisobutylene isomers having either alpha or beta position double bonds. The alpha (or terminal) position double bond (vinylidene) isomer content of the product may range from 20% to 70% thereof, and the content of tetra-substituted internal double bonds is very low, preferably less than about 5% and ideally less than about 1-2%. The mid-range vinylidene content PIB polymer products are desirably prepared by a liquid phase polymerization process conducted in a loop reactor similar to the reactors described in the '913 patent at a temperature which desirably may be about 60° F. or higher using a $BF_3$/methanol catalyst complex and a contact time of no more than about 4 minutes.

U.S. Pat. No. 6,992,152 issued on Jan. 31, 2006 and entitled "Apparatus and Method for Controlling Olefin Polymerization process" (hereinafter the '152 patent) relates, inter alia, to methodology for controlling the operation of reactors such as those described in the '999 and '913 patents so as to achieve efficiencies in process operation and better uniformity of the product of the process. In particular, the '152 patent describes methodology for controlling the ratio of $BF_3$ to catalyst composition to thereby control the reactivity (terminal double bond content) of the product. Specifically, such control is achieved by providing for introduction of a catalyst modifier separately from the introduction of the catalyst composition itself.

U.S. Pat. No. 6,844,401 issued on Jan. 18, 2005 and entitled "Apparatus for Preparing Polyolefin Products and Methodology for Using the Same" (hereinafter the '401 patent) relates, inter alia, to procedures, etc. for improving the processes described above. In particular, the '401 patent describes an olefin reactor system that includes at least two separate reactor zones operating in parallel. Such multiple reactor system provides process efficiencies and advantages particularly in connection with conversion rates and polymer polydispersity. In addition, the '401 patent describes downstream systems for quenching the residual catalyst leaving with the crude product to quickly prevent further reaction, for removal of catalyst residues by washing, and for separation of the product from unreacted monomer, dimers, oligomers and other undesirable contaminants such as diluents and the like.

In accordance with certain of the preferred embodiments of the '913, '999, '152 and '401 patents, polyisobutylene products may be manufactured by processes comprising liquid phase polymerization conducted in a loop reactor at a temperature ranging from 30 to 90° F. The preferred catalyst may be a $BF_3$/methanol catalyst complex and the reactor residence time may usually be no more than about 4 minutes. One of the preferred products may be a relatively low molecular weight, mid-range (50-60%) alpha position (vinylidene) double bond content PIB polymer. At least about 90% of the PIB molecules present in the product are either alpha position (vinylidene) double bond or beta position double bond isomers. The other polyisobutylene isomers produced generally may comprise less than 10% and ideally less than 5% of the molecules.

Table 1 set forth below shows possible isomer structures that might be found in low molecular weight polyisobutylene products. Other isomers may possibly be included in minor amounts and should not affect the overall reactivity of the PIB molecule.

In general, the reactivity of an olefinic double bond is directly related to its degree of substitution. That is to say, the more highly substituted the olefinic double bond, the less reactive it is. Therefore, since Structure I (alpha position or vinylidene double bond) of Table 1 is only disubstituted, it is much more reactive than Structures II, III or IV where the double bond is in a beta position. Structures II and III are both 1,2,2 trisubstituted and are less reactive than Structure I, but because there is an available hydrogen on the terminal carbon, they are more reactive than Structure IV which is 1,1,2-trisubstituted with no terminal hydrogen. Structure V is tetra-substituted and is the least reactive of all the depicted isomers.

Generally speaking, PIB products produced in accordance with the processes described in the '913, '999, '152 and '401 patents discussed above contain mainly Structures I and IV with the other isomers being present in only minor concentrations. Highly reactive (HR) polyisobutylene products (see the '913 patent) may generally contain about 80-85 mole % of Structure I (alpha position double bond) and about 15-20 mole % of Structure IV (beta position double bond). Mid-range vinylidene content PIB polymer products (see the '999 patent), which may sometimes be referred to as "enhanced" products, also are generally predominantly comprised of only Structures I and IV, but generally in a ratio of about 55-60 mole % of Structure I and about 35-40 mole % of Structure IV, respectively, with minor concentrations of the other oligomers.

TABLE 1

Structures of PIB Isomers

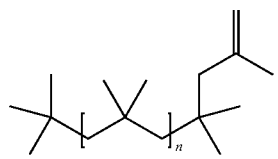

2-2 distributed

I

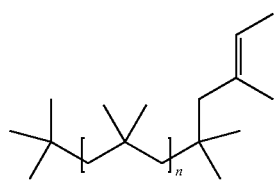

cis 1, 2, 2 trisubstituted

II

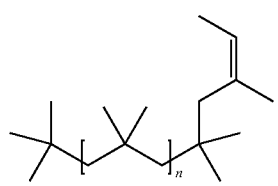

trans 1, 2, 2 trisubstituted

III

TABLE 1-continued

Structures of PIB Isomers

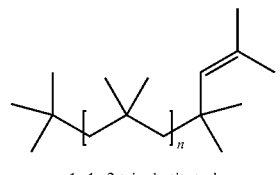

1, 1, 2 trisubstituted

IV

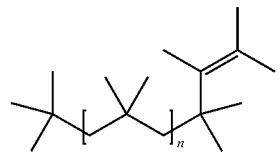

1, 1, 2, 2 tetrasubstituted

V

The '913, '999, '152 and '401 patents discussed above are each assigned to the assignee of the present application, and the entireties of the respective disclosures thereof are specifically incorporated herein by this reference thereto.

In conducting the processes described above, highly specialized equipment and procedures may often be utilized to enhance the operation and control of the polymerization reactions that are involved. Moreover, as in any industrial activity, methodology and/or equipment for enhancing capacity and throughput are sought continually. In particular, it is often very important in production of polyisobutylene to be able to carefully control (optimize) the rate at which the isobutylene is converted to polyisobutylene (conversion rate). It is also highly important in many cases to be able to carefully control (optimize) the polydispersity index (PDI) and/or the number average molecular weight ($M_N$) of the polyisobutylene product. Even more importantly, it is extremely valuable in many commercial applications to be able to carefully control the concentration of reactive (terminal) double bonds in the polyisobutylene product.

SUMMARY OF THE INVENTION

In accordance with the concepts and principles of the invention described herein, a process for production of polyisobutylene is provided which addresses the issues presented in connection with prior art processes such as those described above. In particular, in one of its several important aspects, the invention described herein provides a polyisobutylene production process that includes subjecting a reaction admixture containing isobutylene, a diluent for the isobutylene and a catalyst composition to reaction conditions suitable for causing at least a portion of the isobutylene to undergo polymerization to form a polyisobutylene product including polyisobutylene molecules. The reaction conditions are preferably such that at least a fraction of the polyisobutylene molecules thus produced have alpha position (vinylidene) double bonds and the polyisobutylene product has a number average molecular weight and a polydispersity index. The process of the invention further includes the manipulation of the concentration of the diluent in the admixture to thereby control any one or more of (a) the relative size of the portion of the isobutylene that is converted to polyisobutylene, (b) the number average molecular weight of the product, (c) the polydispersity index of the product and (d) the relative size of the fraction of the polyisobutylene molecules thus produced that possess alpha position double bonds.

In further accordance with the concepts and principles of the invention, the diluent may preferably comprise isobutane and the catalyst composition may comprise a complex of $BF_3$ and a primary alcohol complexing agent. Ideally, the complexing agent may be methanol.

In further accordance with the invention, the reaction admixture may preferably be subjected to suitable reaction conditions in a reaction zone where the reaction admixture is maintained in an intimately intermixed condition. Ideally, the zone may comprise a loop reactor reaction zone.

In still further accordance with the concepts and principles of the invention, it has been found that the relative size of the portion of the isobutylene that is converted to polyisobutylene is a direct function of the diluent concentration, the polydispersity index of the product is an indirect function of the diluent concentration, the average molecular weight of the product is an indirect function of the diluent concentration, and the relative size of the fraction of the produced polyisobutylene molecules having alpha position double bonds is a direct function of the diluent concentration. Thus, and again in accordance with the concepts and principles of the invention, the concentration of the diluent in the admixture may be increased to thereby increase the relative size of said fraction and/or said portion, the concentration of the diluent in the admixture may be increased to thereby decrease the polydispersity index of the product, and the concentration of the diluent in the admixture may be decreased to thereby increase the average molecular weight of the product.

Desirably, the concentration of the diluent in the admixture should be no more than about 50 weight % and preferably, the concentration of the diluent in the admixture should be no more than about 30 weight %, and ideally the concentration of the diluent in the admixture should be in the range of from about 8 to about 15 weight %.

In further accord with the concepts and principles of the invention, a process is provided which may include the step of selecting a diluent concentration for the admixture corresponding to a given relative size of said fraction, and the manipulating step may comprise maintaining the diluent content of the admixture at the selected concentration to thereby hold the relative size of said fraction essentially constant. In addition, the process may include the step of selecting a diluent concentration for the admixture corresponding to a given polydispersity index level, and the manipulating step may comprise maintaining the diluent content of the admixture at the selected concentration to thereby hold the polydispersity index of the product essentially constant. Also, the process may include the step of selecting a diluent concentration for the admixture corresponding to a given relative size of said portion, and the manipulating step may comprise maintaining the diluent content of the admixture at the selected concentration to thereby hold the relative size of the portion essentially constant. Of course, as would be readily understood by the routineer in the olefin polymerization art, the specific numerical correspondence between diluent concentration and any one or more of polydispersity index, molecular weight, size of fraction and/or size of portion will often need to be determined empirically in advance in order to have a set of values from which to select a predetermined diluent concentration. Conversely, the content and/or characteristics of the product stream may simply be monitored and the diluent concentration varied as needed in response.

In further accordance with the invention, the process may include the steps of treating the product to remove diluent and unreacted isobutylene therefrom and recycling at least one of the diluent and the unreacted isobutylene back to the reaction zone.

Furthermore, the invention provides a process for production of polyisobutylene that comprises subjecting a reaction admixture comprising isobutylene, a diluent for the isobutylene and a catalyst composition to reaction conditions suitable for causing at least a portion of the isobutylene to undergo polymerization to form a polyisobutylene product including polyisobutylene molecules and wherein at least a fraction of the polyisobutylene molecules have alpha position double bonds, said polyisobutylene product having a number average molecular weight and a polydispersity index, said polyisobutylene product having at least one parameter that is variable as a function of the concentration of the diluent in the admixture, said at least one parameter comprising (a) the relative size of said fraction, (b) the number average molecular weight of the product, (c) the polydispersity index of the product or (d) the relative size of the portion. In accordance with this aspect of the invention, the process may include the steps of choosing a diluent concentration corresponding to a pre-selected value of said at least one parameter and then maintaining the admixture at said chosen diluent concentration to thereby hold said parameter at the pre-selected value. In further accordance with this aspect of the invention, the parameter comprises the relative size of said portion, the average molecular weight of the product, the polydispersity index of the product and/or the relative size of said fraction.

The invention further provides an improved process for production of polyisobutylene wherein a reaction admixture including isobutylene, a diluent for the isobutylene and a catalyst composition is subjected to reaction conditions suitable for causing at least a portion of the isobutylene to undergo polymerization to form a polyisobutylene product including polyisobutylene molecules, wherein at least a fraction of the polyisobutylene molecules have alpha position double bonds and wherein the polyisobutylene product has a number average molecular weight and a polydispersity index, the improvement comprising increasing the concentration of the diluent in the admixture to thereby increase the relative size of said fraction, increase the relative size of said portion, decrease the number average molecular weight of the product, and/or decrease the polydispersity index of the product.

Conversely, the invention provides an improved process for production of polyisobutylene wherein a reaction admixture including isobutylene, a diluent for the isobutylene and a catalyst composition is subjected to reaction conditions suitable for causing at least a portion of the isobutylene to undergo polymerization to form a polyisobutylene product including polyisobutylene molecules, wherein at least a fraction of the polyisobutylene molecules have alpha position double bonds and wherein the polyisobutylene product has a number average molecular weight and a polydispersity index, the improvement comprising decreasing the concentration of the diluent in the admixture to thereby decrease the relative size of said fraction, decrease the relative size of said portion, increase the number average molecular weight of the product, and/or increase the polydispersity index of the product.

The invention further provides novel polyisobutylene products produced by the processes described above.

BRIEF DESCRIPTION OF THE DRAWINGS

The invention is described in detail below wherein like numerals and letters indicate like features and wherein.

DETAILED DESCRIPTION OF THE PREFERRED EMBODIMENTS

Figure 1:
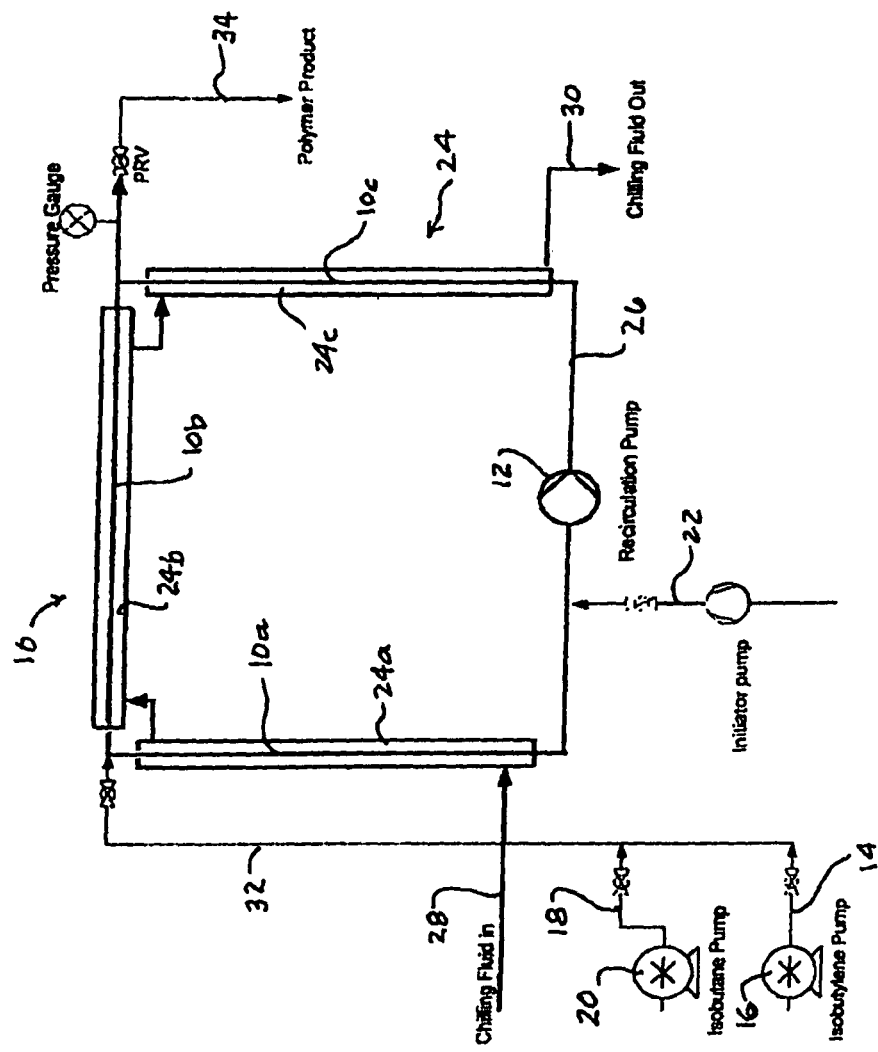
FIG. 1 is a schematic diagram illustrating a laboratory reactor arrangement set-up for conducting isobutylene polymerization processes in accordance with the invention.

Reference will now be made in detail to preferred embodiments of the present invention, examples of which are illustrated in the accompanying drawings.

The concepts and principles of the invention described herein are generally applicable in connection with each of the various PIB reactors and PIB production processes illustrated in the '913, '999, '152 and '401 patents discussed above, and should be applicable in connection with all reactors and reactor systems that are used for the production of highly reactive and/or mid-range vinylidene content PIB polymer products using liquid phase polymerization procedures. In this regard, it is to be noted that the feedstock for such reactors may comprise either isobutylene or an admixture of isobutylene and a suitable non-reactive diluent (solvent) therefor. Suitable feedstocks are described generally in the '913, '999, '152 and '401 patents discussed above. A particularly preferred feedstock comprises a high purity isobutylene monomer having a composition as set forth below in Table 2.

TABLE 2

Concentrations of individual components of Isobutylene stream

| Component | Weight % |
|---|---|
| Methane | 0.026 |
| Ethane | 0.0006 |
| Propane | 0.0024 |
| Propylene | 0.027 |
| Isobutane | 0.064 |
| N-butane | 0.010 |
| Butene-1 | 0.016 |
| Isobutylene | 99.84 |

TABLE 2-continued

Concentrations of individual components of Isobutylene stream

| Component | Weight % |
|---|---|
| T-butene-2 | 0.010 |
| C-butene-2 | 0.063 |
| 1,3 butadiene | 0.007 |
| $C_5+$ | 0.007 |

In accordance with the concepts and principles of the invention, in the liquid phase production of polyisobutylene, an important and formerly unknown relationship between diluent concentration and the alpha vinylidene content of the product has been discovered. That is to say, in accordance with the concepts and principles of the invention, it has been discovered that an increase in diluent concentration in the reaction admixture generally results in higher alpha position (vinylidene) double bond concentration in the product. Moreover, in the same manner, an increase in diluent concentration leads generally to greatly improved (narrower) polydispersity indices. In these regards, and in further accordance with the invention, the diluent content in the reaction admixture may be 50 weight % or less, may desirably be 30 weight % or less, and may optimally be 10 weight % or less. Ideally, the desired diluent for isobutylene may be isobutane. However, in a more general sense, the desirable diluent should simply be capable of dissolving both isobutylene and polyisobutylene and should be inert to the polymer forming reactions taking place in the reactor. In this latter regard, a $C_3$-$C_{16}$ alkane or alkene, or a mixture of such substances, may be used as the diluent. Desirably, the diluent may be a $C_3$-$C_{16}$ 1-alkene such as, for example, butene-1. In another sense, the diluent may advantageously comprise a mixture of hydrocarbons such as, for example, $C_4$s and other light hydrocarbons.

As mentioned above, the processes of the present invention may generally and suitably be used in connection with the equipment and processes described in the '913, '999, '152 and '401 patents. However, for further clarity, the invention will be described here in connection with a simplified experimental reaction system 10 shown schematically in FIG. 1.

With reference to FIG. 1, the experimental reaction system 10 may desirably include a loop reactor 10, a recirculation pump 12, an isobutylene monomer inlet 14 which may include a pump 16, a diluent inlet 18 which also may include a diluent pump 20, an inlet 22 for the catalyst complex (initiator), and chilling system 24 to remove the heat of the exothermic polymerization reaction. As shown, the loop reactor 10 may include segments 10a, 10b and 10c as well as a pipe 26 which interconnects segments 10a and 10c as shown and provides a place for connection of pump 12. And as can be seen in FIG. 1, a chilling system 24 for the system may desirably include cooling jackets 24a, 24b and 24c respectively for the reactor segments 10a, 10b and 10c, a chilling fluid inlet 28 and a chilling fluid outlet 30. In addition, the system may also include a feedstock inlet 32, where the isobutylene monomer and a diluent are received and admixed for introduction into the reactor, and a product outlet 34 where the crude polymer product is withdrawn from the system.

In operation, a reaction mixture comprising isobutylene, a diluent for the isobutylene and a catalyst composition are recirculated by pump 12 through reactor segments 10a, 10b and 10c and pipe 26 while reaction conditions suitable for causing at least a portion of the isobutylene to undergo polymerization to form a polyisobutylene product including polyisobutylene molecules are maintained in the reactor 10.

In the meanwhile, isobutylene and a diluent therefor are introduced into the reactor 10 via inlet 32, catalyst composition (initiator) is introduced into the reactor via inlet 22 and crude product is withdrawn from the system via outlet 34.

Using the system 10, experiments were conducted maintaining the total flow rate of monomer to the reactor loop at 100 mL/min. Reactions were carried out at temperatures of 40° F. and 60° F. The pressure in the reactor loop was maintained at 200 psi. The internal diameter of the reactor tubes was 0.305" and the total reactor volume was 228 cm$^3$. Catalyst (initiator) flow was controlled at 0.02 mL/min such that the reaction set point was maintained. The recirculation rate in the reactor loop was 2 gpm. The catalyst composition comprised a complex of $BF_3$ and methanol wherein the molar ratio of $BF_3$ to methanol was 1:1. No modifier (methanol) was added to the reactor separately from the catalyst complex, although such a step might be desirable under some conditions. In this latter regard, the separate addition of modifier is described in detail in the '152 patent discussed above. A high purity isobutylene (purity >99.5 weight %) was used as the feedstock and a relatively high purity isobutane (purity 95 to 98 weight %) was used as the diluent.

Experiments were conducted at various diluent concentration levels to study the effect of diluent concentration on alpha position double bond content, molecular weight ($M_N$) and polydispersity index (PDI) of the product. In these experiments, the diluent level was varied between 0 and 27 weight %.

The chain end concentrations of the isomers were measured using $^{13}C$ NMR spectroscopy. The molecular weight measurements were made using size exclusion chromatography (SEC).

Figure 2:
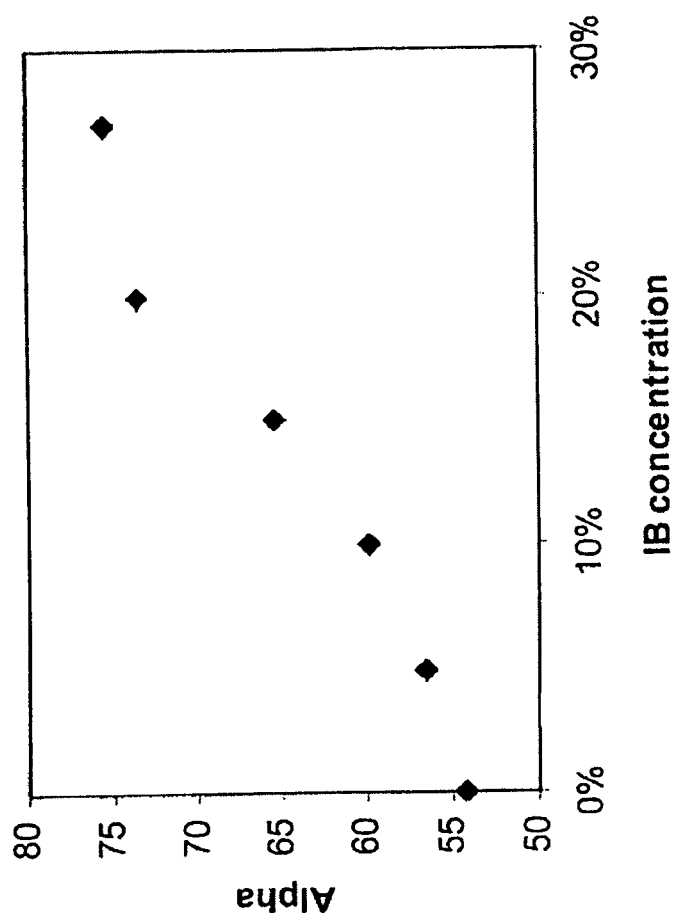
FIG. 2 is a graph showing the variation of polymer alpha (vinylidene) double bond content with changing diluent concentration (data at 40° F.)
Figure 3:
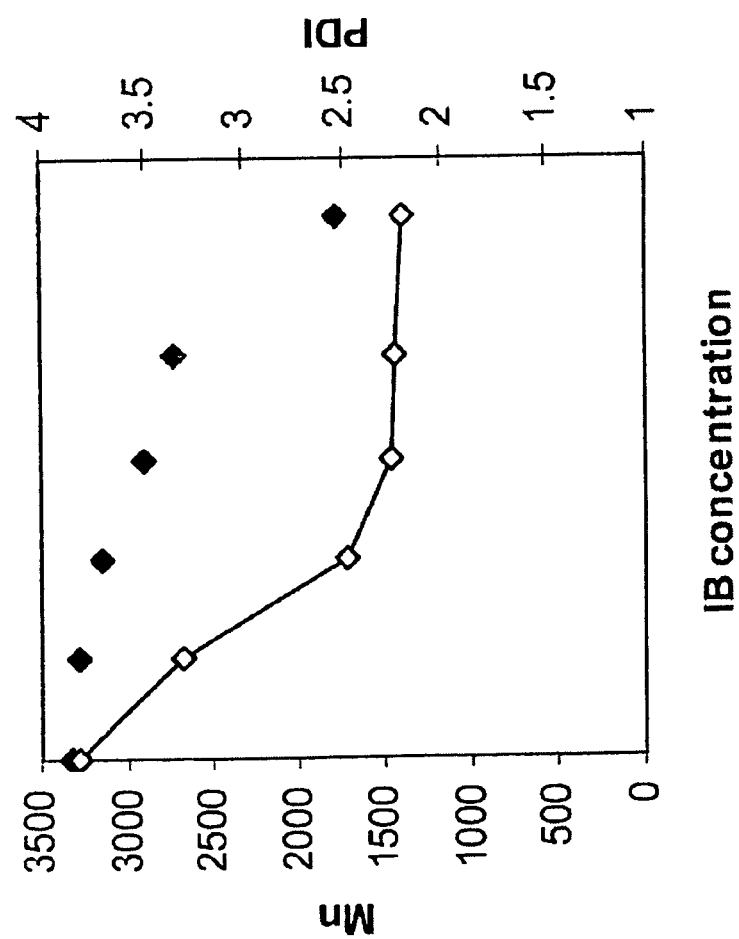
FIG. 3 is a graph showing molecular weight ($M_N$) and polydispersity index (PDI) trends with changing diluent concentration (data at 40° F.) (filled symbols show $M_N$ values—left axis; unfilled symbols show PDI—right axis)
Figure 4:
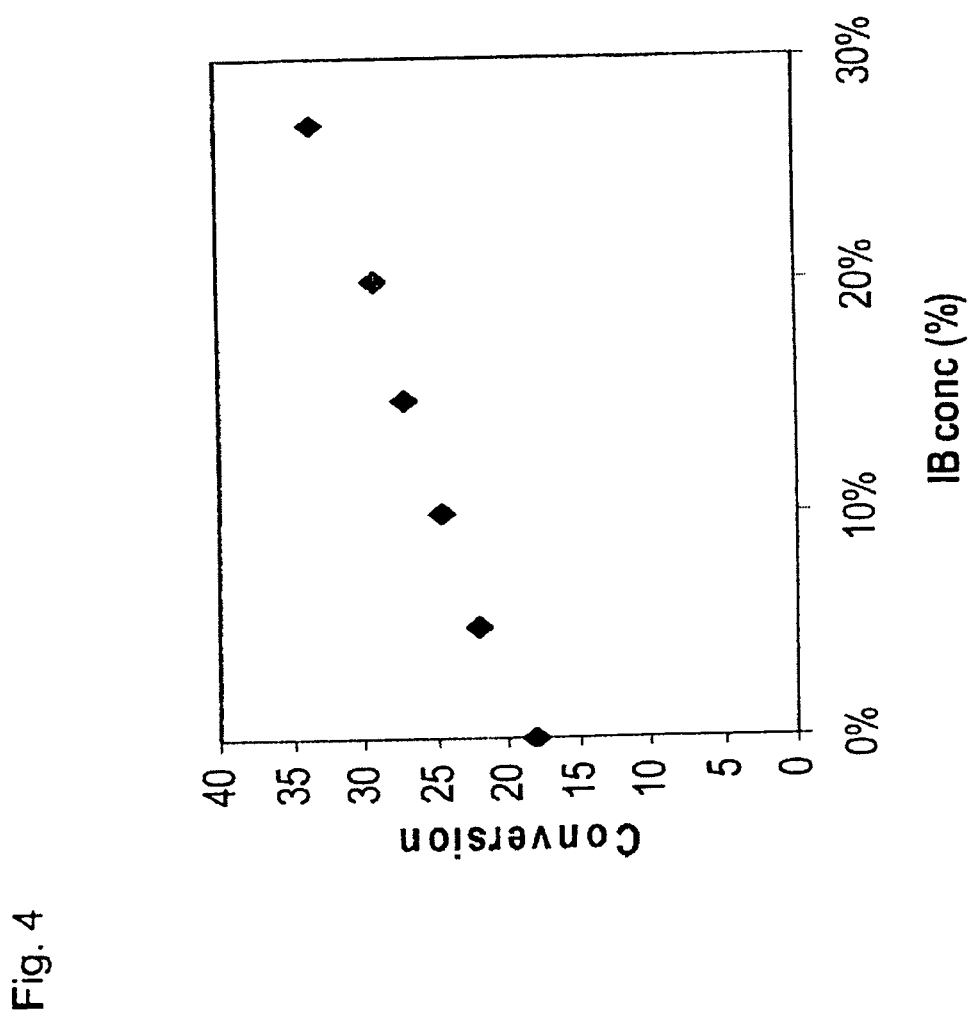
FIG. 4 is a graph showing conversion trends with changing diluent content.

The results of the experimentation are illustrated in FIGS. 2, 3 and 4. FIG. 2 shows variations in alpha position double bond isobutylene isomer content with changes in isobutane diluent concentration at 40° F. And as can be seen in FIG. 2, alpha isomer content increases with increased diluent concentration. Thus it is clear that the alpha isomer content of the product may be increased simply by increasing the concentration of the diluent in the reaction admixture. Also it is clear that if other conditions dictate, the alpha isomer content of the product may be decreased simply by decreasing the concentration of the diluent in the reaction admixture.

With reference to FIG. 3, the influence of diluent concentration on number average molecular weight ($M_N$) and polydispersity index (PDI) can be seen. In FIG. 3, $M_N$ values are shown on the left axis and are represented by the filled symbols, while PDI values are shown on the right axis and are represented by the unfilled symbols. Of particular interest is the large drop in PDI at almost constant molecular weight between 0 and 10 wt % of diluent (isobutane) concentration. This may be of particular benefit in meeting the commercially valuable polydispersity specifications for PIB polymers. Thus it is clear that the PDI of the product may be decreased simply by increasing the concentration of the diluent in the reaction admixture. Also it is clear that if other conditions dictate, the PDI of the product may be increased simply by decreasing the concentration of the diluent in the reaction admixture. Furthermore, it is clear that the molecular weight of the product may be decreased simply by increasing the concentration of the diluent in the reaction admixture. Also it is clear that if other conditions dictate, the molecular weight of the product may be increased simply by decreasing the concentration of the diluent in the reaction admixture.

With reference to FIG. 4, it can also be seen that the rate of conversion of isobutylene into polyisobutylene increases with increasing diluent content. This perhaps can be attributed to the fact that higher diluent concentrations in the reactor may provide improved heat transfer characteristics.

As can be seen from the foregoing, alpha isomer content increases, polydispersity decreases, conversion increases and molecular weight decreases with increasing isobutane diluent concentration. Trends similar to those observed at 40° F. were also observed when the polymerization reactions were conducted at 60° F. Tabulated experimental data is reported below in Tables 3 and 4. As can be seen, these Tables also show the concentration of alpha and beta isomers in the polyisobutylene product obtained.

TABLE 3

Data showing the effect of diluent concentration on PIB properties at 40° F.

| Isobutane Diluent Concentration (wt %) | Number Average Molecular Weight ($M_N$) | Polydispersity Index (PDI) | Concentration of Alpha Isomer (Structure I) | Concentration of Beta Isomer (Structure IV) | Other Isomers | Conversion Rate |
|---|---|---|---|---|---|---|
| 0 | 3318 | 3.81 | 54.2 | NA | NA | 17.9 |
| 5 | 3288 | 3.31 | 56.5 | 33.6 | 9.9 | 22.1 |
| 10 | 3155 | 2.47 | 59.9 | 32.3 | 7.8 | 24.6 |
| 15 | 2909 | 2.25 | 65.4 | 32.5 | 2.1 | 27.2 |
| 20 | 2724 | 2.22 | 73.41 | 18.1 | 8.4 | 29.1 |
| 27 | 1785 | 2.19 | 75.3 | 20.3 | 4.4 | 33.4 |

TABLE 4

Data showing the effect of diluent concentration on PIB properties at 60° F.

| Isobutane Diluent Concentration (wt %) | Number Average Molecular Weight ($M_N$) | Polydispersity Index (PDI) | Concentration of Alpha Isomer (Structure I) | Concentration of Beta Isomer (Structure IV) | Other Isomers | Conversion Rate |
|---|---|---|---|---|---|---|
| 0 | 2249 | 2.71 | 53.0 | NA | NA | 48.3 |
| 5 | 2373 | 2.23 | 54.4 | 34.8 | 10.8 | 52.3 |

TABLE 4-continued

Data showing the effect of diluent concentration on PIB properties at 60° F.

| Isobutane Diluent Concentration (wt %) | Number Average Molecular Weight ($M_N$) | Polydispersity Index (PDI) | Concentration of Alpha Isomer (Structure I) | Concentration of Beta Isomer (Structure IV) | Other Isomers | Conversion Rate |
|---|---|---|---|---|---|---|
| 10 | 2217 | 2.17 | 63.1 | 30.7 | 6.2 | 51.5 |
| 15 | 1637 | 1.91 | 69.5 | 25.3 | 5.2 | 57.5 |
| 20 | 1389 | 1.89 | 70.0 | 22.9 | 7.1 | 57.7 |
| 27 | 1109 | 1.85 | 73.3 | 17.6 | 9.1 | 62.3 |

Figure 5:
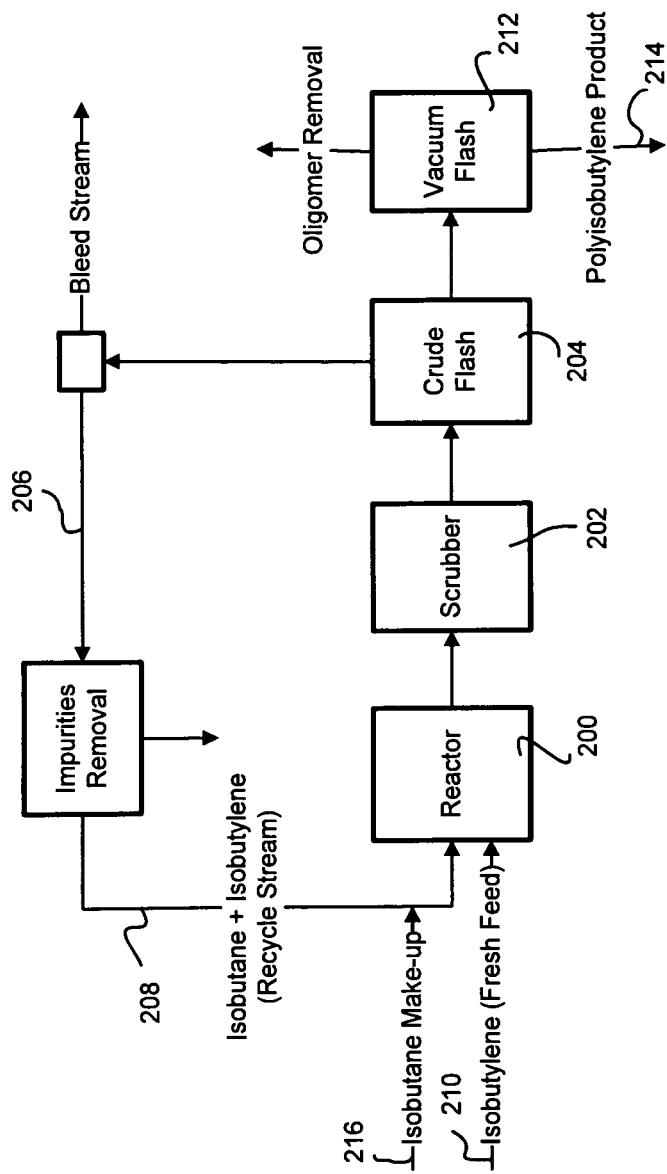
FIG. 5 is a schematic diagram depicting a PIB production process equipped for continuous recycling of isobutylene and/or diluent.
Figure 6:
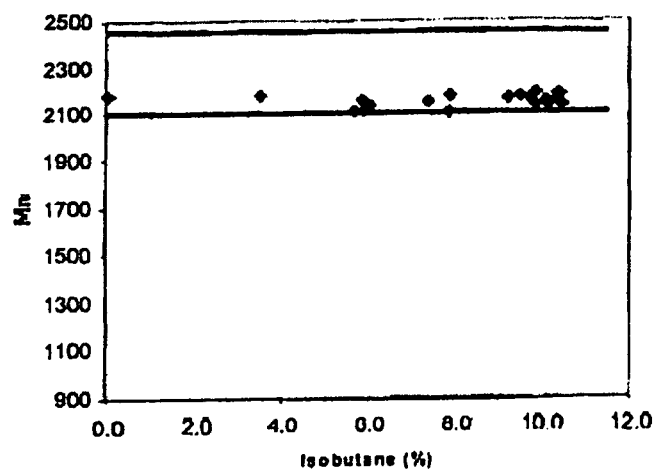
FIG. 6 is a graph showing variations in $M_N$ with changing diluent (isobutane) concentration.
Figure 7:
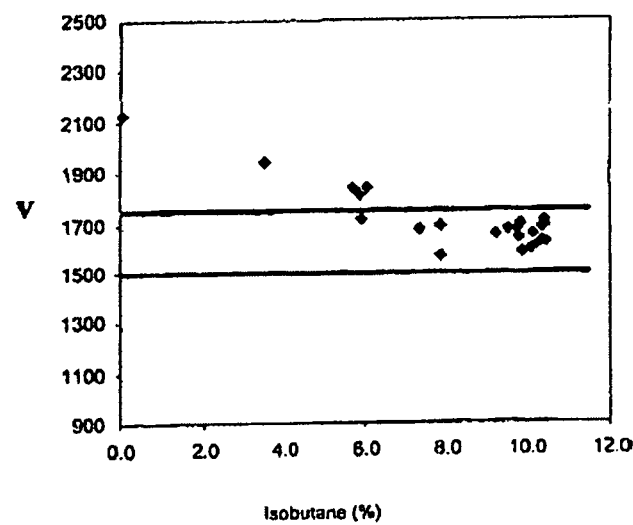
FIG. 7 is a graph showing variations of viscosity (v) with changing diluent (isobutane) concentration.
Figure 8:
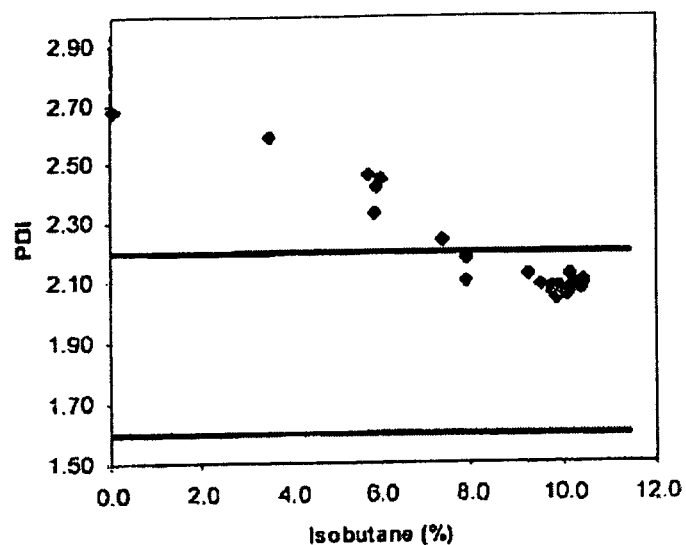
FIG. 8 is a graph showing variations of PDI with changing diluent (isobutane) concentration.
Figure 9:
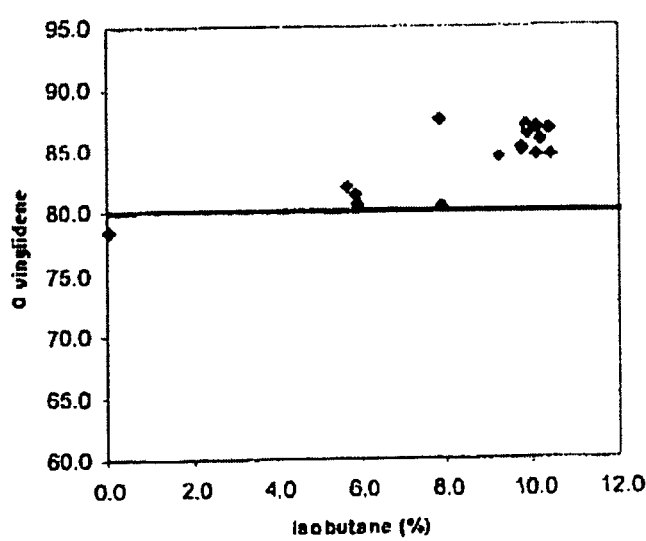
FIG. 9 is a graph showing variations of alpha (vinylidene) double bond content with changing diluent (isobutane) concentration.

In further accordance with the concepts and principles of the invention, the process also may provide for the continuous recycle of diluent and/or unreacted isobutylene. Such a process is depicted schematically in FIG. 5. With reference to FIG. 5, a reaction admixture comprising isobutylene, a diluent for isobutylene (advantageously isobutane) and a catalyst composition (preferably a complex of $BF_3$ and a complexing agent such as methanol) is subjected in reactor 200 to reaction conditions suitable for causing at least a portion of the isobutylene to undergo polymerization to form a polyisobutylene product including polyisobutylene molecules. The conditions in reactor 200 are such that at least a fraction of the thus produced polyisobutylene molecules in the product have alpha position double bonds and the polyisobutylene product has a number average molecular weight and a polydispersity index. Upon leaving the reactor 200, the crude polyisobutylene product is washed in a scrubber 202 to remove catalyst residue and is subjected to flashing in a crude flash zone 204 to remove diluent and unreacted isobutylene. The product is then appropriately beneficiated further in a flash unit 212 and delivered downstream via outlet 214. At least a portion of the diluent and unreacted isobutylene flashed in zone 204 may then desirably be continuously recycled overhead back to the reactor 200 via lines 206 and 208. The diluent concentration in the reaction admixture in reactor 200 may desirably be manipulated and/or kept constant at any given time at such a level that it provides maximum benefit to the process in maintaining a desired alpha isomer content as well as in maintaining a low PDI. This, of course, may be done by adding diluent via line 216. The feed rate of fresh isobutylene delivered via line 210 may then be determined by the isobutylene conversion rate in the reactor, i.e., the higher the conversion rate, the higher the rate of fresh isobutylene feed. In addition, whenever desired, the diluent concentration may be varied to alter the alpha isomer content of the product, the PDI of the product, the molecular weight of the product and/or the conversion rate. In this latter connection, it is noteworthy that the alpha isomer content of the product and the conversion rate vary directly with diluent concentration while product molecular weight and PDI vary indirectly with diluent concentration.

Additional experimental data was gathered in connection with studies involving the synthesis of a highly reactive grade (alpha double bond content more than 80%) PIB using a scaled up version of a reactor which is set up essentially the same as the reactor 10. In connection with these studies, additional modifier is introduced essentially as described in the '152 patent. These studies reveal that it is greatly beneficial to operate the reactor using an isobutane diluent concentration of about 8-15 weight % and the following discussion is based on data derived therefrom.

In these studies, a reaction temperature of about 27° F. was maintained employing a chiller temperature of about 5° F. The input flow rate (isobutylene+diluent) was approximately 26 gpm and the volumetric flow rate of the recirculation pump was about 1260 gpm.

The catalyst flow rate was adjusted (ideally to between 0.03 and 0.05 weight % of the feed rate) such that a constant operating temperature was maintained. As per the '152 patent, the modifier was introduced separately into the reactor maintaining a methanol to catalyst ratio of 0.63:1 to synthesize a highly reactive (high vinylidene content) PIB product. In a highly reactive product, it is desirable for the molecular weight ($M_N$), the PDI and the viscosity to be within certain limits, usually dictated by product specifications. One such product may have the following specifications: $M_N$-2100 to 2500; PDI-1.6 to 2.2; Kinematic Viscosity (v)—1500 to 1750; and Alpha double bond content—Greater than 80 mole %. The usual aim of the manufacturing process is that all these specifications be met simultaneously.

In connection with the foregoing, the Kinematic viscosity (v) was measured using Cannon Fenske tubes immersed in a viscosity bath (Koehler KV3000). The $M_N$ and PDI measurements were obtained using SEC measurements as described earlier. The values obtained for the different parameters are as shown in FIGS. 6 thru 9. The dark heavy lines on the graphs show the desired specification parameters.

An essentially pure isobutane stream having a composition as set forth in Table 5 below was obtained from ISGAS for use in an effort to isolate the effects on PIB production of minor impurities in the isobutane diluent, although in a real practical sense it is generally not feasible to use such a material in a commercial operation. The total oxygenate content of the pure diluent stream was less than about 5 ppm (≈3.4 ppm methanol; ≈1.4 ppm MTBE).

TABLE 5

Purity of individual components of Isobutane diluent (99.8% purity)

| Components | Weight % |
|---|---|
| Propane | 0.02 |
| Isobutane | 99.79 |
| N-butane | 0.18 |

The experimental set-up and conditions for these efforts were essentially the same as those described above in connection with reaction system 10. The experimental data obtained as a result of these efforts are set forth below in Table 6.

TABLE 6

Product properties obtained using high purity Isobutane

| Isobutane diluent concentration weight % | $M_N$ | PDI | Kinematic Viscosity | Alpha position double bond content mole % |
|---|---|---|---|---|
| 0 | 3292 | 4 | 3489 | 61.4 |
| 8 | 3197.7 | 2.55 | 2693 | 58.5 |
| 13 | 2946.9 | 2.48 | 2637 | 59.9 |
| 18 | 2883 | 2.43 | 2628 | 60.1 |
| 25 | 2751 | 2.29 | 2213 | 60.3 |

It can be observed from Table 6 that the major advantage of being able to operate so as to produce a PIB having decreased polydispersity was achieved. That is to say, a substantial decrease in PDI and simultaneously in viscosity is achieved with increasing diluent concentration, while almost constant molecular weight is maintained. This is beneficial in a commercial sense for meeting both $M_N$ and PDI/viscosity specifications simultaneously. However, there is almost no change in the alpha double bond content with increasing isobutane diluent concentration as was observed in the case of lower purity isobutane.

In view of the foregoing it is clear that the present invention provides a mechanism for greatly reducing both PDI and viscosity by increasing diluent concentration with no substantial corresponding decrease in molecular weight. In addition, both viscosity and PDI can be maintained within specifications while achieving a target molecular weight. This is especially important in the production of HR (high vinylidene) grades of PIB where controlling the polydispersity and viscosity within specifications is of paramount importance. Moreover, the use of a lower purity isobutane diluent resulted in higher alpha double bond content as compared to high purity isobutane diluent. This could be the result of the presence of other hydrocarbon components in the feed or could be due to the presence of oxygenates other than methanol. With regard to the foregoing, it seems to be more likely that the other oxygenates play a role in the increased vinylidene content. In accordance with our studies, the primary suspect is dimethyl ether. These oxygenates play a role similar to additional methanol that is added as a modifier. As is known, methanol is also an oxygenate which may be added in a controlled manner to regulate vinylidene content.

It appears that the invention provides the greatest benefit when the PIB production process is operated using a diluent concentration in the range of from about 8 to about 15 weight %, beyond which the gains are diminished as $M_N$ starts to decrease, especially when a lower purity (industrial grade) isobutane diluent is employed.

Although alpha position double bond content increases with increasing isobutane dilution (in the impure isobutane example), the more desired manner to control alpha content is by setting a suitable methanol to catalyst ratio. This is due to the fact that there usually is minimal control in an industrial setting over feedstock composition.

We claim:

1. A process for production of polyisobutylene comprising:
    subjecting a reaction admixture comprising isobutylene, a diluent for said isobutylene and a catalyst composition to reaction conditions in a reaction zone suitable for causing at least a portion of said isobutylene to undergo polymerization to form a polyisobutylene product including polyisobutylene molecules, at least a fraction of said polyisobutylene molecules having alpha position double bonds, said polyisobutylene product having a number average molecular weight and a polydispersity index;
    choosing a diluent concentration corresponding to a preselected value of at least one parameter selected from the size of the fraction or the molecular weight;
    maintaining the admixture at said chosen diluent concentration to thereby hold said parameter at said preselected value;
    treating said product to remove diluent and unreacted isobutylene therefrom; and
    recycling at least one of the diluent and the unreacted isobutylene back to said zone, wherein said diluent consists essentially of isobutane and a $C_3$-$C_{16}$ 1-alkene.

2. The process as set forth in claim 1, wherein the diluent comprises a mixture of isobutane and 1-butene.

3. A process for production of polyisobutylene comprising:
    subjecting a reaction admixture comprising isobutylene, a diluent for said isobutylene and a catalyst composition to reaction conditions suitable for causing at least a portion of said isobutylene to undergo polymerization to form a polyisobutylene product including polyisobutylene molecules, at least a fraction of said polyisobutylene molecules having alpha position double bonds, said polyisobutylene product having a number average molecular weight and a polydispersity index, said polyisobutylene product having at least one parameter that is variable as a function of the concentration of said diluent in said admixture, said at least one parameter comprising (a) the relative size of said fraction, (b) the number average molecular weight of said product, (c) the polydispersity index of said product or (d) the relative size of said portion;
    choosing a diluent concentration corresponding to a preselected value of at least one parameter; and
    maintaining the admixture at said chosen diluent concentration to thereby hold said parameter at said preselected value,
    wherein diluent comprising a $C_3$-$C_{16}$ 1-alkene and optionally a $C_3$-$C_{16}$ alkane is provided to a reactor independently of fresh isobutylene monomer.

4. The process according to claim 3, wherein the independently provided diluent consists essentially of isobutane and a $C_3$-$C_{16}$ 1-alkene.

* * * * *